United States Patent [19]

Rushing

[11] Patent Number: 4,502,258
[45] Date of Patent: Mar. 5, 1985

[54] DRIVEN-TYPE SECTIONALIZED SURVEY MONUMENT RESISTANT TO REMOVAL

[75] Inventor: William C. Rushing, Madison, Wis.

[73] Assignee: Berntsen, Inc., Madison, Wis.

[21] Appl. No.: 534,414

[22] Filed: Sep. 21, 1983

Related U.S. Application Data

[63] Continuation of Ser. No. 253,056, Apr. 10, 1981, abandoned.

[51] Int. Cl.³ .................................................. E04F 9/02
[52] U.S. Cl. ........................................ 52/103; 52/155; 52/165
[58] Field of Search .................. 52/155, 103, 165, 104

[56] References Cited

U.S. PATENT DOCUMENTS

| | | |
|---|---|---|
| 791,442 | 6/1905 | Anderson . |
| 1,177,180 | 3/1916 | Garton . |
| 1,214,679 | 2/1917 | Hindmarsh . |
| 1,308,939 | 7/1919 | Eggleston .............................. 52/155 |
| 1,902,875 | 3/1933 | Mason . |
| 2,038,962 | 4/1936 | Sculthess .............................. 52/155 |
| 3,279,133 | 10/1966 | De Korte . |
| 3,378,967 | 4/1968 | Baumeister . |
| 3,688,014 | 8/1972 | Versteeg . |
| 3,716,649 | 2/1973 | Smith et al. . |
| 3,899,856 | 8/1975 | Johnson . |
| 3,916,821 | 11/1975 | Pies . |
| 3,952,878 | 4/1976 | Gorham ................................ 52/155 |
| 4,087,945 | 5/1978 | Berntsen .............................. 52/103 |
| 4,252,472 | 2/1981 | Moraly . |

FOREIGN PATENT DOCUMENTS

1214297 12/1970 United Kingdom .

Primary Examiner—John E. Murtagh
Attorney, Agent, or Firm—Isaksen, Lathrop, Esch, Hart & Clark

[57] ABSTRACT

A sectionalized, driven-type survey monument (10) is disclosed having at least one cylindrical rod section (11), a penetrating point section (14) attached by a threaded connector (28) seated in bores (26, 27) in the adjacent cylindrical rod section (11) and the point section (14), and an anti-twist rod section (19) attached by a threaded connector (34) to a cylindrical rod section (12). The anti-twist rod section (19) includes a substantially cylindrical body (20) and straight fins (21) which extend radially outward from the cylindrical body over part of the length of the body. The monument is driven into the ground a section at a time, with additional cylindrical rod sections being added to allow the monument to be driven as deeply as desired. Rotation of the penetrating point section as it is driven into the ground, caused by the action of biased turning surfaces (16) on the point section (14), causes the connections between each of the sections in the series to be tightened during driving. The finned anti-twist rod section (19) is usually attached as the last section and, when driven into the ground, resists rotation so as to insure maximum tightening of the connections between the sections in the series. The fins on the anti-twist rod section also prevent this section from being unscrewed and removed by vandals.

8 Claims, 3 Drawing Figures

U.S. Patent     Mar. 5, 1985     4,502,258
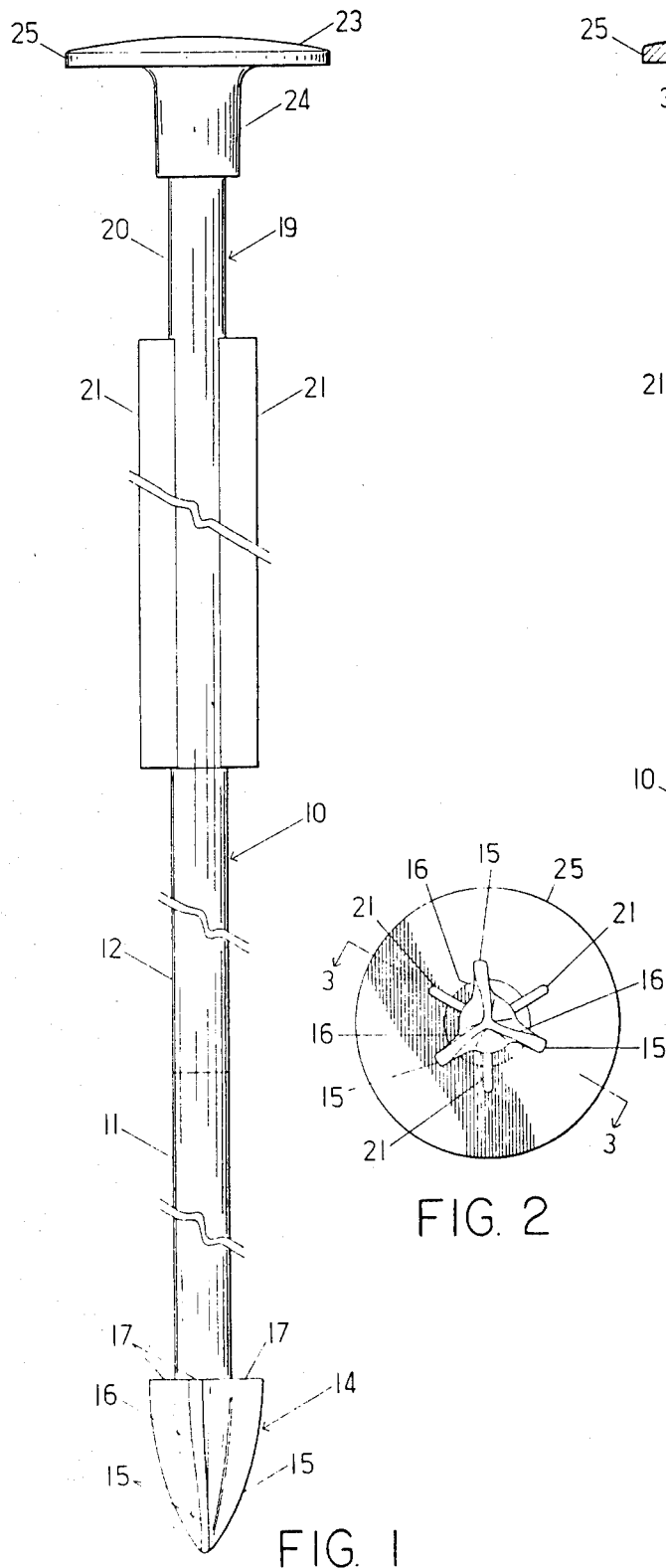
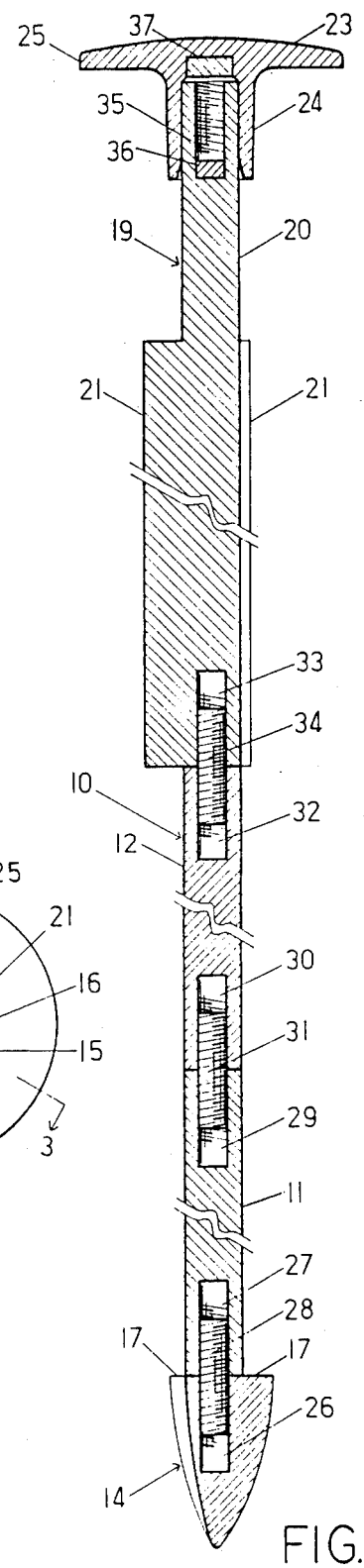
FIG. 1
FIG. 2
FIG. 3

DRIVEN-TYPE SECTIONALIZED SURVEY MONUMENT RESISTANT TO REMOVAL

CROSS REFERENCE TO RELATED APPLICATION

This application is a continuation of application Ser. No. 253,056, filed Apr. 10, 1981 now abandoned.

TECHNICAL FIELD

This invention relates generally to the field of monuments and markers used to mark boundaries in surveying.

BACKGROUND ART

Over history, surveyors have used a variety of objects, such as rocks, blocks of stone, steel reinforcing bars, scrap metal, and poured concrete as reference points in their work of locating the boundary lines of land. Since it is highly desired that survey markers be permanent, blocks of cut stone have traditionally found favor; however, the use of stone blocks as survey monuments becomes obviously impractical where surveying is being conducted in remote areas not easily accessible by trucks and other vehicles.

A particular type of survey monument which has been used increasingly in surveying, particularly in remote areas, is shown in the prior U.S. patent to Berntsen, et al, U.S. Pat. No. 4,087,945. This patent shows a plurality of cylindrical aluminum rod sections which are added together one by one as the rod series is driven into the ground. Such multi-section survey markers have become popular because they are relatively light and can be carried to remote locations without undue burden, because they are essentially permanent, and because they can be driven deep into the ground to resist withdrawal or accidental dislodging, even in such unstable earth environments as the Alaskan tundra where the permafrost tends to throw off (during the alternate heating and cooling of the permafrost) objects which are not buried or embedded below the frost line. Sections of rod can easily be added to the multisection monument as it is driven into the ground so that the point of the monument can reach below the permafrost.

A problem is commonly encountered in modern surveying as it probably was in an antiquity: boundary monuments are often vandalized so that the location of a boundary line is lost, or the boundary marker is deliberately moved after it has been set by the surveyor. Any kind of survey monument is vulnerable to being deliberately moved, even a heavy stone block; the type of driven-type survey monument shown in U.S. Pat. No. 4,087,945 is less vulnerable to being moved because it is generally driven too far in the ground to be pulled out, but it still may be tampered with by unscrewing the top rod section and pulling it from the ground to destroy the evidence of the location of the survey marker.

DISCLOSURE OF THE INVENTION

The survey monument of the present invention comprises an improved driven-type survey monument which is substantially vandal proof and is particularly adapted to utilization in unstable earth conditions, such as the Alaskan permafrost. The monument comprises a series of cylindrical rod sections which are connected together in end-to-end relationship with threaded connectors seated in the bores between adjacent rods such that the rods are tightened together as the series is driven into the ground by the turning action of a penetrating point section attached to the lower-most cylindrical rod. Biased turning surfaces on barbs formed on the penetrating point section provide a slight rotation of the bottom rod as the series is driven into the ground, thereby exerting a torque on the series of rods which tends to turn them in a direction to tighten the rods together in end-to-end relationship. An anti-twist rod section is attached by a threaded connector to the top end of a cylindrical rod in the series and has a generally cylindrical body with fins formed integrally therewith and extending out peripherally from the body over part of the length of the body. The uppermost rod, which may be the anti-twist rod section, is topped with a marker cap. A marking magnet to facilitate relocation of the survey monument may be embedded into the marker cap, or may be inserted into the bore at the top end of the uppermost rod.

The turning of the entire rod series caused by the action of the biased turning surfaces on the penetrating point section continues until the outwardly extending fins on the anti-twist rod section enter the ground. As these fins become firmly engaged with the ground, they resist the torque provided by the action of the penetrating point section and cause the whole series of rod sections to be turned together even more tightly than they would be if simply driven into the ground without any means to resist turning of the uppermost rod. Such restraint on turning of the uppermost rod may be especially significant in soft or muddy ground where the resistance between the surfaces of the rod series and the ground as the series turns is not great enough to ensure a differential torque between each cylindrical rod section as the series of rods is driven into the ground.

The rod series is driven into the ground until the fins on the anti-twist rod are embedded beneath the ground and only the cylindrical portion of the anti-twist rod extends above the ground. The marked cap may then be tapped on to the top of the anti-twist rod to complete installation of the monument. If an attempt is made to vandalize the monument, the marker cap can possibly be removed, but the rod series is resistant to removal because the penetrating point preferably has outwardly extending retention shoulders which engage the ground at the end of the monument and resist upward pulling forces, and because the upper edges of the fins on the anti-twist rod similarly engage the ground and resist an upward pull. Moreover, the anti-twist rod cannot simply be unscrewed from the rod below it since the fins on the rod make turning of the rod impossible. Thus, the only way that the anti-twist rod can be removed is by digging up the earth around the monument at least until the anti-twist rod is exposed and then screwing or cutting it off, a difficult task which disturbs the earth around the monument to provide evidence that the monument was deliberately tampered with. If the cap alone is removed, location of the remaining portion of the monument can be obtained if a magnet has been placed in the open portion of the bore remaining under the threaded connectors in one or more of the series of cylindrical rods. Magnetic test equipment can then be used to detect the presence of the buried magnets, whose field is generally not affected by the aluminum of which the rod monument series is formed.

The fins also serve to dissipate the heat from the sun striking the cap which would otherwise be conducted to the lower rods. This is an important feature where the rods are embedded in permafrost, since the heat from the rods can melt the adjacent permafrost, which would allow the monument to be more easily pulled out.

Further objects, features, and advantages of the invention will be apparent from the following detailed description taken in conjunction with the accompanying drawings showing a preferred embodiment of a driven-type survey monument in accordance with the invention.

BRIEF DESCRIPTION OF THE DRAWINGS

In the drawings:

FIG. 1 is an elevation view of a survey monument embodying the invention.

FIG. 2 is a view of the monument of FIG. 1 taken from the bottom of FIG. 1.

FIG. 3 is a cross-sectional view of the monument of FIG. 1 taken along the lines 3—3 of FIG. 2.

BEST MODE FOR CARRYING OUT THE INVENTION

With reference to the drawings, a preferred embodiment of a survey marker in accordance with the invention is shown generally at 10 in FIG. 1. The monument 10 includes at least one cylindrical rod of uniform cross-section 11 forming part of a series of rods which may include one or more additional cylindrical rods such as the rod shown at 12. A penetrating point section 14 is attached to the bottom of the lowermost cylindrical rod 11 and includes barbs 15 which extend outwardly and have biased turning surfaces 16 which urge rotation of the point section as the point is driven into the ground. The torque applied to the point section by the ground is transmitted from the point section to the cylindrical rods 11 and 12. Substantially flat retention shoulders 17 are preferably formed on the upper end of the barbs 15 so as to inhibit the penetrating point being pulled, along with the rest of the rod series, from the ground.

An upper, rotation resisting anti-twist rod section 19 is connected to the uppermost cylindrical rod 12. The rod section 19 preferably has a cylindrical body 20 and three fins 21 radiating outwardly from the cylindrical body in regular spacing about the circumference of the rod body. The fins 21 are preferably extruded integrally with the body portion 20 out of aluminum stock. In a typical manufacturing process, the fins and cylindrical body are continuously extruded and are cut off at desired lengths for the uppermost rod, which may be, for example, in 1 foot, 2 foot, or 3 foot lengths. The fins 21 are preferably formed rectangularly, as shown in FIG. 1. and preferably extend out from the surface of the rod body a distance approximately equal to the diameter of the body. The fins 21 do not extend the entire length of the anti-twist rod 19, but rather terminate at a point spaced several inches from the top of the rod—not less than three inches and preferably three to four inches. In the process of manufacturing this uppermost rod, the fins are formed continuously with the body, and thereafter are removed by cutting or grinding off the desired portion of the fins to leave the uniform cylindrical body extending upwardly from the top edges of the fins 21 to the end of the rod.

The entire rod series is topped off by a marker cap 23 which is preferably tapped onto the top end of the rod 19. The cap 23 preferably includes a socket portion 24 which has a slightly tapered, longitudinally fluted inside surface which is adapted to fit over the upper end of the anti-twist rod. The marker cap also includes a preferably circular, substantially flat crown 25, formed on the top of the socket portion 24 which has a top surface which provides space for any marking or notations that the surveyor wishes to provide for future reference.

A bottom view of the survey monument 10 is shown in FIG. 2, illustrating the biased turning surfaces 16 formed on the barbs on the point section; these surfaces are orientated at a slight angle to the vertical, e.g., about 5° from vertical or from the axis of the series of rods forming the monument 10. The biased turning surfaces may actually be slightly curved, as best shown in FIG. 1, so that the tip of the point section engages the ground with the barbs extending directly outwardly and with the surface of each barb turning away from the vertical to cause a biased movement or twisting of the point section which can be transmitted to the rod to which the point is connected.

The connections between the point section and the lowermost rod and between each of the rods in the series forming the monument 10, is best shown with reference to the cross-sectional view of FIG. 3, which is taken along the line 3—3 of FIG. 2. The upper surface of the penetrating point section 14 has a bore 26 therein which has been tapped to provide internal threading, and a mating bore 27 is formed in the lower section of the lowermost cylindrical rod 11 which is also tapped to provide internal threading. A threaded connector 28 is seated in the bores 26 and 27 and threadingly engaged with the walls of the bores 26 and 27 to firmly connect the point section 14 and the lowermost rod section 11. Similarly, the upper end of the cylindrical rod section 11 has a bore 29 formed therein which is tapped and which mates with a bore 30 in the cylindrical rod section 12 next above it, which is also tapped. A threaded connector 31 is threaded into the threads in the bores 29 and 30 and, when the abutting flat faces of the cylindrical rods 11 and 12 meet, the threaded internal connector 31 holds the rods tightly together. Similarly, the top of the rod 12 has an internal, tapped bore 32 formed therein, and the bore 32 mates with a tapped bore 33 in the bottom end of the anti-twist rod section 19. The rod 19 may also have a threaded bore 35 formed in its top end, as shown, since it may be desired, in some applications, to connect additional sections of either cylindrical rods or finned rods (similar to the rod 19) to the upper end of the anti-twist rod 19. The bottom of all the bores may be formed such that the threads therein extend only part of the way into the bore, leaving the bottom portion of the bore untapped to allow a small magnet to be placed therein. For example, a magnet 36 is shown emplaced at the bottom of the bore 35 to aid in the location of the monument if the cap 23 is removed. The cap itself preferably contains a magnet 37 embedded within the cap to aid location of the monument under normal conditions.

So that the monument may be as permanent and resistant to climate and soil conditions as possible, the penetrating point section 14, the cylindrical rod sections 11 and 12, the finned anti-twist rod section 19 and the marker cap 23 are all formed of a high grade of aluminum or an aluminum-magnesium alloy. The threaded connectors which connect the series of cylindrical rods and the finned rods or rods together—such as the connectors 28, 31 and 34 shown in the drawings—are preferably formed of a stainless steel alloy high in chromium and nickel to provide maximum strength and resistance to chemical action, and minimum potential galvanic action or electrolysis between the connectors and aluminum-magnesium alloy rods.

In utilizing the survey monument of the invention, the surveyor threads one of the threaded connectors 28 onto a cylindrical rod and threads on the penetrating point section 14 onto the threaded connector. Another threaded connector is emplaced in the bore at the upper end of the first rod and a driving tool (not shown) fits over the end of the rod and the threaded connector. The point section and the first rod are then driven into the ground until the top end of the first rod protrudes a few inches above the ground. A second cylindrical rod is then turned onto the connector protruding from the first rod and driven into the ground. The process may be repeated, so that several cylindrical rods of uniform cross-section, substantially more than the two rods 11 and 12 shown in FIGS. 1 and 3, are driven into the ground. As the rod series is driven down, the penetrating point section 14 turns the whole series of rods in a direction to tighten the rods onto the threaded connectors and to push the flat top and bottom end surfaces of each rod into tight, abutting relationship with the ends of adjacent rods.

Many rods may be attached together in the above-described manner to form a rod series which penetrates deeply into the ground. A deeply set monument is desirable, and even necessary, in unstable ground conditions such as marshes or on tundra land. The necessity for deeply driven monuments is especially acute in regions which have permafrost. The alternate melting and freezing of the permafrost causes objects embedded in the permafrost to tend to float to the surface. The rod series may be driven down below the permafrost line so that the point section 14 is embedded in solid earth to anchor the entire rod series.

The finned, anti-twist rod section 19 is generally the last rod section to be placed as the series of rods is being driven into the ground. The finned end of the rod section is attached to the threaded connector extending from the rod that has just been driven into the ground, and the end of the anti-twist rod which does not have the fins extending therefrom has a driving tool placed thereover to facilitate driving without damaging the end of the rod section. The rod series is driven downwardly until the top edges of the fins 21 are preferably 3 or 4 inches below ground level, with the cylindrical end of the rod 19 located at or just above the ground level so that the marking cap 23 can be tapped on it. The rod series is now in place and provides a highly stable, substantially vandal proof monument, since, even if the cap 23 is removed, the fins 21 prevent the rod 19 from being rotated so as to unscrew it from the rod below. The fins 21 also help to resist upward pulling of the monument from the ground, complementing the action of the retention shoulders 17 on the point section 14.

The fins 21 also enhance the tight connections between the entire rod series below, since the fins 21 resist the torque applied to the rod series by the penetrating point section 14. In so resisting the torque applied by the penetrating point, the entire rod series is placed under a very strong torque in a direction to turn each rod tightly together with the rods adjoining it.

The fins 21 also provide another useful feature for monuments used in tundra conditions since the fins tend to dissipate the heat of the sun falling on the head of the monument. The sun's heat would otherwise be transmitted down the length of the aluminum rod series since the aluminum rods are excellent conductors of heat. In permafrost conditions, the heat in the rods would tend to melt the permafrost adjacent to the rods, thus making it easier to remove the rod series from the permafrost. Because the sun's heat is largely transmitted through the relatively large area of the fins 21 to the adjacent ground, the ground is not substantially warmed, and the temperature of the rod series itself may be stabilized at a temperature below the freezing point of water.

The fins on the rod 19 also have the effect of stiffening the body 20 of the rod so that the rod is less susceptible to bending and breaking. For this reason, it may sometimes be desirable to embed two or more finned rod sections 19 into the ground to produce a monument which is structurally very strong and even more resistant to vandalism. A finned rod section which will be beneath the top-most rod section can utilize fins extending the entire length of the rod since such a rod section does not need to accept a marker cap at its end.

It is understood that the invention is not confined to the particular construction and arrangement of parts herein illustrated and described, but embraces such modified forms thereof as come within the scope of the following claims.

I claim:

1. A sectionalized driven-type survey monument resistant to removal, comprising:
   (a) at least one cylindrical rod section of uniform cross-section, each such rod section having threaded bores formed in its top and bottom ends and flat surfaces on the ends surrounding the bores;
   (b) a penetrating point section attached to the lower end of an adjacent cylindrical rod section and having at least two generally longitudinal barbs radially spaced on the periphery of the penetrating point section, each of the barbs having a biased turning surface thereon to cause rotation of the point section as it is driven into the ground, the upper end of the penetrating point section having a threaded bore formed therein adapted to mate with the threaded bore formed in the lower end of the adjacent cylindrical rod section and a flat end surface surrounding the bore;
   (c) a rotation resistant anti-twist rod section having an elongated cylindrical body and straight fins formed integrally with and extending outwardly from the cylindrical body over a portion of the length of the cylindrical body and terminating at a position spaced downwardly from the top end of the cylindrical body such that the uniform cylindrical body extends from the top edges of the fins to the top end of the anti-twist rod section whereby a survey marker cap can be placed over the top end without interference by the fins, the lower end of the cylindrical body having a threaded bore formed therein adapted to mate with the threaded bore of the upper end of the adjacent cylindrical rod section and a flat end surface surrounding the bore; and
   (d) threaded connectors seated in the bores in the ends of the penetrating point section, cylindrical rod section and the anti-twist rod section and connecting them in a series so that the surfaces of the upper end of the penetrating point section and the lower end of the adjacent cylindrical rod section and the surfaces of the lower end of the anti-twist rod section and the upper end of the adjacent cylindrical rod section are in engagement, whereby the driving of the penetrating point section into the ground will cause it to exert a torque on the adjacent cylindrical rod section which will be transmitted to and resisted by the fins on the anti-twist rod section as the fins enter into the ground so as to cause the connections between all sections to be tightened.

2. The monument of claim 1 wherein there are three fins on the anti-twist rod section which are substantially rectangular in shape and are spaced regularly about the periphery of the cylindrical body portion of the rod section.

3. The monument of claim 1 wherein the cylindrical rod section, penetrating point section and anti-twist rod section are formed of an aluminum-magnesium alloy, and wherein the fins on the anti-twist rod section are extruded integrally with the body portion of the rod section.

4. The monument of claim 1 including an aluminum marker cap having a downwardly extending socket portion having a longitudinally fluted socket therein adapted to fit tightly over the upper end of the cylindrical body portion of the anti-twist rod section.

5. The monument of claim 1 wherein the upper end of the anti-twist rod section has a bore formed therein and including a magnet placed in this bore to thereby facilitate magnetic location of the monument.

6. The monument of claim 1 wherein each of the bores formed in the upper and lower ends of the cylindrical rod sections are not threaded all the way to the bottom of the bore to leave a space for insertion and embedding of a magnet therein to facilitate magnetic location of the monument.

7. The monument of claim 1 including at least two cylindrical rod sections connected by threaded connectors between the penetrating point section and the anti-twist rod section.

8. The monument of claim 1 wherein the fins on the anti-twist rod section terminate at least three inches from the top end of the cylindrical body portion of the rod section.

* * * * *